(12) United States Patent
Pong

(10) Patent No.: US 7,711,902 B2
(45) Date of Patent: May 4, 2010

(54) AREA EFFECTIVE CACHE WITH PSEUDO ASSOCIATIVE MEMORY

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 121 days.

(21) Appl. No.: 11/399,360

(22) Filed: Apr. 7, 2006

(65) Prior Publication Data

US 2007/0239938 A1      Oct. 11, 2007

(51) Int. Cl.
*G06F 12/00* (2006.01)

(52) U.S. Cl. .................. 711/133; 711/122; 711/144; 711/E12.042; 711/E12.069

(58) Field of Classification Search ............. None
See application file for complete search history.

(56) References Cited

U.S. PATENT DOCUMENTS 6,836,826 B2 * 12/2004 Sharma ................. 711/122
6,928,522 B2 * 8/2005 Yang ..................... 711/144
7,277,992 B2 * 10/2007 Shannon et al. ......... 711/141
2003/0208658 A1 * 11/2003 Magoshi ................ 711/122

* cited by examiner

*Primary Examiner*—Reginald G Bragdon
*Assistant Examiner*—Shawn X Gu
(74) *Attorney, Agent, or Firm*—Sterne, Kessler, Goldstein & Fox PLLC

(57) ABSTRACT

A memory system is provided comprising a memory controller, a level 1 (L1) cache including L1 tag memory and L1 data memory, a level 2 (L2) cache coupled to the L1 cache, the L2 cache including L2 tag memory having a plurality of L2 tag entries and a L2 data memory having a plurality of L2 data entries. The L2 tag entries are more than the L2 data entries. In response to receiving a tag and an associated data, if L2 tag entries having corresponding L2 data entries are unavailable and if a first tag in a first L2 tag entry with an associated first data in a first L2 data entry has a more recent or duplicate value of the first data in the L1 data memory, the memory controller moves the first tag to a second L2 tag entry that does not have a corresponding L2 data entry, vacates the first L2 tag entry and the first L2 data entry and stores the received tag in the first L2 tag entry and the received data in the first L2 data entry.

13 Claims, 10 Drawing Sheets

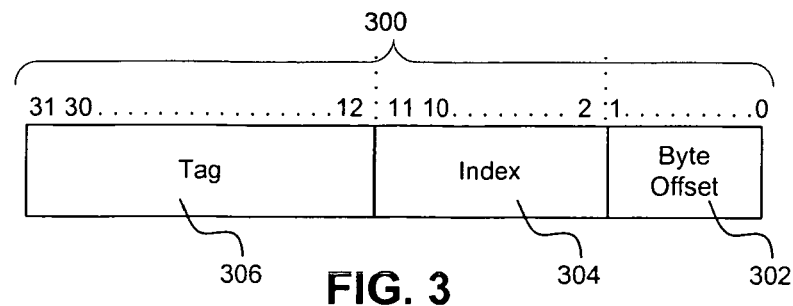
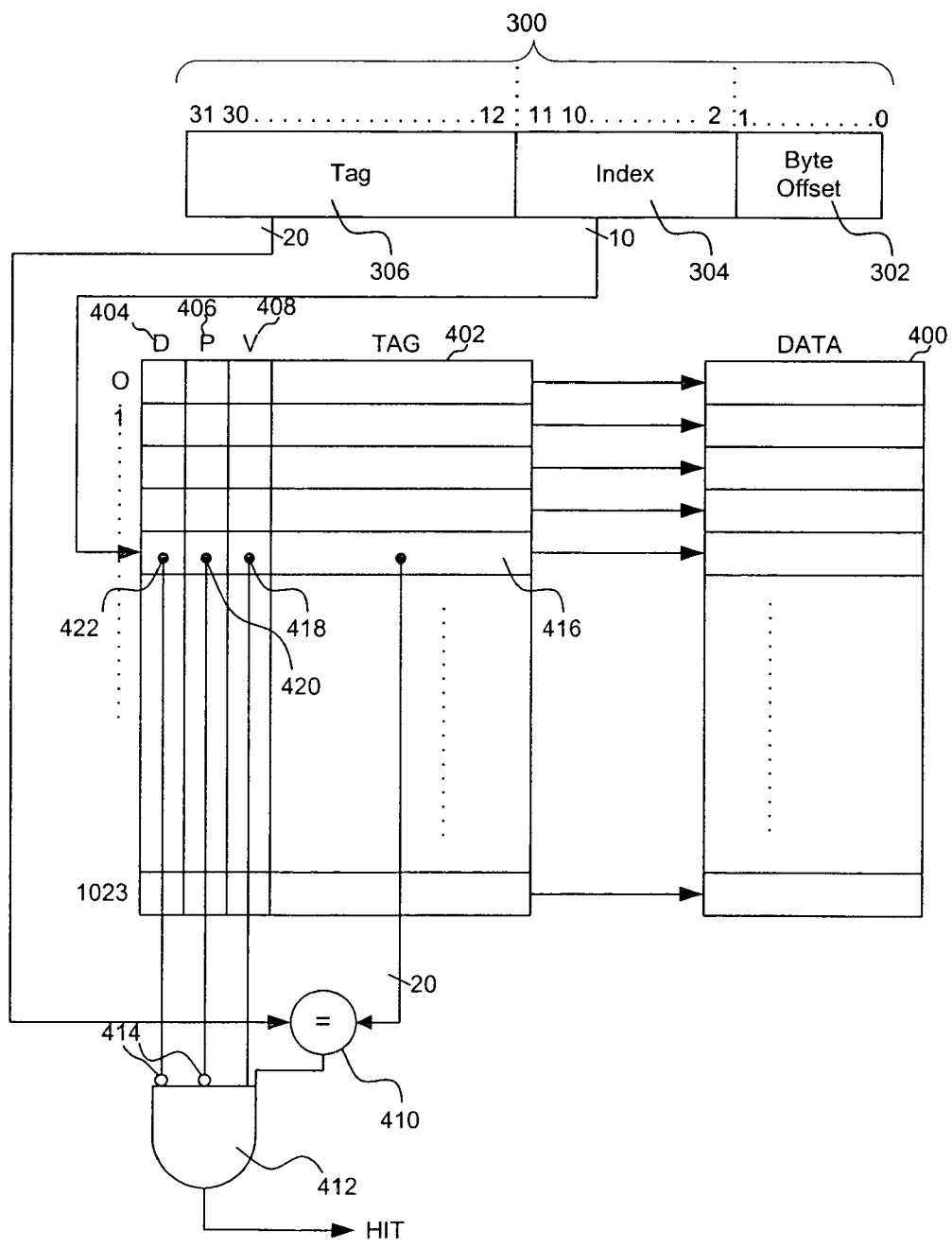
FIG. 3
FIG. 4

AREA EFFECTIVE CACHE WITH PSEUDO ASSOCIATIVE MEMORY

BACKGROUND OF THE INVENTION

1. Field of the Invention

This invention is generally relates to computer memory and more specifically to cache memory.

2. Background Art

In the field of information technology, the terms "storage" or "memory" refer to media that retain data for some interval of time, possibly even after electrical power to the computer is turned off. In a business or personal computer system, storage often takes the form of either a hard disk, random access memory (RAM) or cache memory. A hard disk stores the user's files and programs even if the computer is turned off, and has a large capacity. Random Access Memory (RAM) is used to store information such as programs and data temporarily while the computer is using them. RAM can be accessed at very high speeds, which makes it suitable for applications, however RAM used for these purposes is typically volatile and all information in it is lost when the computer is turned off. Cache memory is often built into the microprocessor, hard drives, or other devices and provides high speed dedicated memory to minimize repeated access to slower storage devices.

Caches are common in most computer systems and are used to speed up instruction execution and data retrieval and updates. A memory cache, or "CPU cache," is a memory bank that bridges main memory and the CPU. A cache is usually either temporary or permanent memory. It is faster than main memory and allows instructions to be executed and data to be read and written at higher speed. Instructions and data are usually transferred from main memory to the cache in blocks. In most cases, the more sequential the instructions in the routine being executed or the more sequential the data being read or written, the greater chance the next required item will already be in the cache, resulting in better performance. Caches serve as temporary staging areas, and their contents are constantly changing.

A "memory cache" or "CPU cache" is a memory bank that bridges main memory and the CPU. It is faster than main memory and allows instructions to be executed and data to be read and written at higher speeds. Instructions and data are usually transferred from main memory to the cache in blocks. A level 1 (L1) cache is a memory bank built into the CPU chip. A level 2 (L2) cache is a secondary staging area that provides data to the L1 cache. L2 cache may be built into the CPU chip, reside on a separate chip in a multi-chip package module or be a separate bank of chips on the motherboard.

A disk cache is a section of main memory or memory on the disk controller board that bridges the disk drive and the CPU. When the disk is read, usually a larger block of data is copied into the cache than is immediately required. If subsequent reads find the data already stored in the cache, there is no need to retrieve it from the disk, which is slower to access. If the cache is used for writing, data are queued up at high speed and then written to disk during idle machine cycles by the caching program. Disk caches are usually just a part of main memory which is usually made up of common dynamic RAM (DRAM) chips, whereas memory caches usually use higher-speed static RAM (SRAM) chips.

The CPU accesses memory according to a distinct hierarchy. Whether data comes from permanent storage such as the hard drive, an input device such as the keyboard or external to the computer system such as over a network, most data is first stored in random access memory (RAM). The CPU then stores pieces of data it will need to access, often in a cache, and maintains certain special data and instructions in the register.

A cache often has two parts, a tag and a data portion. The tag usually contains the index of the datum in main memory which has been cached and information describing the contents in the data portion of the cache. The data portion of a cache is usually significantly larger than the tag portion. Conventional designs all adopt a design such that there are N data entries if there are N tag entries. However, under circumstances, one only needs to keep meta-information in tag entries, and the corresponding data space is wasted.

What is needed is a method to optimize data space while maintaining functionality of the cache.

BRIEF SUMMARY OF THE INVENTION

In an embodiment a memory system for storing data is provided. The memory system comprises a memory controller, a level 1 (L1) cache including L1 tag memory and L1 data memory, a level 2 (L2) cache coupled to the L1 cache, the L2 cache including L2 tag memory having a plurality of L2 tag entries and a L2 data memory having a plurality of L2 data entries. The L2 tag entries are more than the L2 data entries. In response to receiving a tag and an associated data, if L2 tag entries having corresponding L2 data entries are unavailable and if a first tag in a first L2 tag entry with an associated first data in a first L2 data entry has a more recent or duplicate value of the first data in the L1 data memory, the memory controller moves the first tag to a second L2 tag entry that does not have a corresponding L2 data entry, vacates the first L2 tag entry and the first L2 data entry and stores the received tag in the first L2 tag entry and the received data in the first L2 data entry.

In an embodiment, a method for storing data in a memory system is provided. The memory system includes a memory controller, a L1 cache having a L1 tag memory and a L1 data memory, and a L2 cache having a L2 tag memory including a plurality of tag entries and a L2 data memory including a plurality of data entries, wherein the L2 cache has more tag entries in L2 tag memory than data entries in L2 data memory. The method comprises receiving a tag and a corresponding data and determining if all L2 tag entries having corresponding L2 data entries are unavailable. If all L2 tag entries having corresponding L2 data entries are unavailable the method further comprises determining if a first tag in a first L2 tag entry with an associated first data in a first L2 data entry has a more recent or duplicate of the first data in the L1 data memory. If a more recent or duplicate of the first data is present in the L1 data memory, the method further comprises moving the first tag to a second L2 tag entry that does not have a corresponding L2 data entry, vacating the first L2 tag entry and the first L2 data entry and storing the received tag in the first L2 tag entry and the received data in the first L2 data entry.

In an embodiment, a SMP architecture including n processor cores, n L1 caches and a common L2 cache is provided. In response to receiving a tag and an associated data, if L2 tag entries having corresponding L2 data entries are unavailable and if a first tag in a first L2 tag entry with an associated first data in a first L2 data entry has a more recent or duplicate value of the first data in one of the L1 caches, the memory controller moves the first tag to a second L2 tag entry that does not have a corresponding L2 data entry, vacates the first L2 tag entry and the first L2 data entry and stores the received tag in the first L2 tag entry and the received data in the first L2 data entry. N presence bits are associated with the first tag in the second L2 tag entry to track the L1 cache that has the more recent or duplicate data.

Additional features and advantages of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. The detailed description is not intended to limit the scope of the claimed invention in any way.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates an example address.

FIG. 4 illustrates an example cache and the address used to access the cache.

Figure 1:
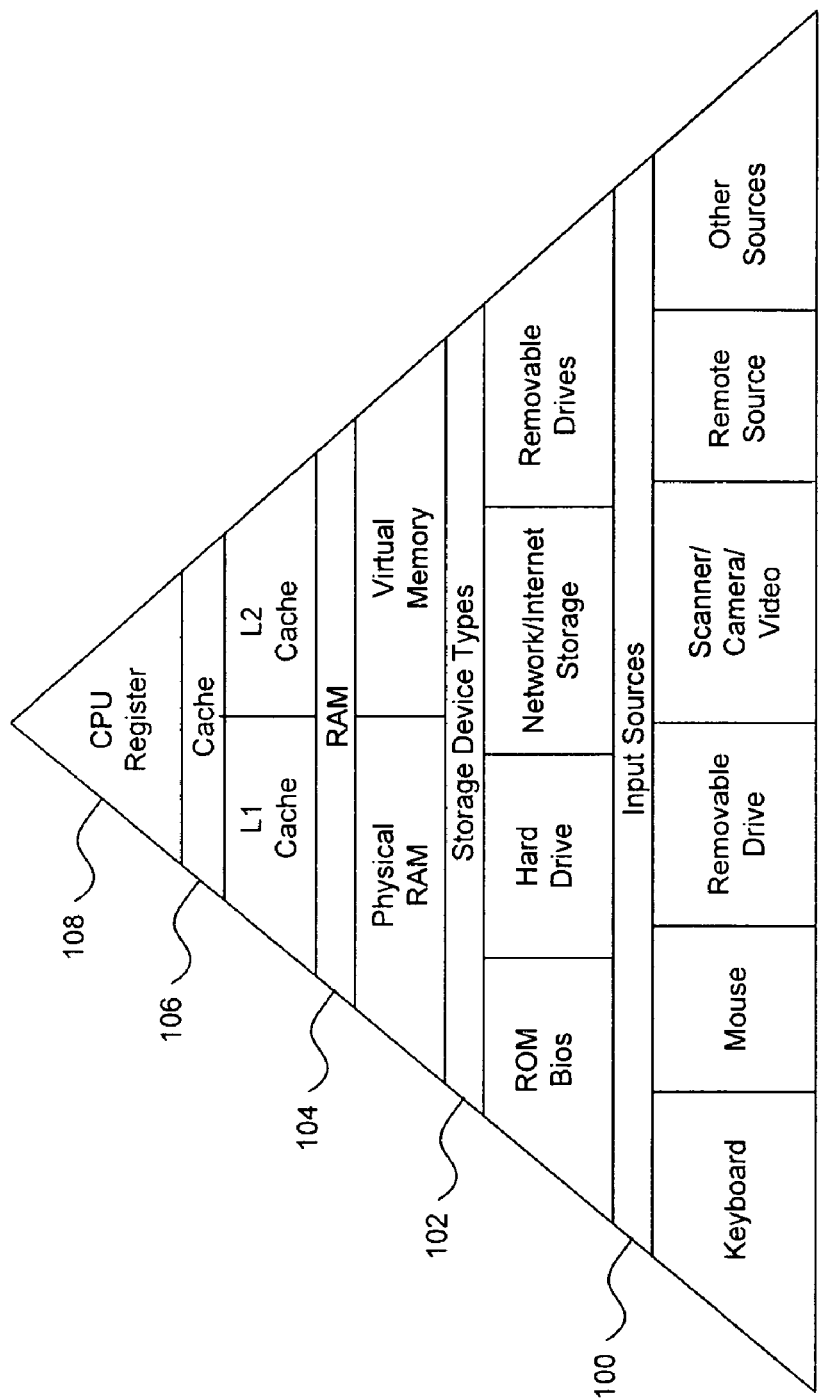
FIG. 1 illustrates an example memory hierarchy.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Table of Contents

1. Terminology
2. Example Environment
   2a. Memory Hierarchy
   2b. Caches
3. Example Embodiments
4. Conclusion The present invention will be described in terms of embodiments applicable to memory architectures. It will be understood that the essential memory architecture and memory management concepts disclosed herein are applicable to a wide range of computing devices and memory systems and can be applied to memory systems having varied purposes. Thus, although the invention will be disclosed and described using cache memory architectures as examples, the scope of the invention is not in any way limited to this field.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Terminology

A "clean" entry refers to a data value that has not been modified in one or more levels of a memory hierarchy.

A "dirty" entry refers to a data value that has been modified in one or more levels of a memory hierarchy.

A "pseudo" entry or location refers to a tag entry that does not have a corresponding physical data location.

A "non-pseudo" entry or location refers to a tag entry that has a corresponding physical data location.

Example Environment

Memory Hierarchies

FIG. 1 illustrates an example memory hierarchy comprising external input sources 100, permanent storage devices 102 and temporary storage sources such as RAM 104, cache 106 and the CPU register file 108. The CPU accesses memory according to a distinct hierarchy. The bottom of the pyramid comprises external input sources 100 including but not limited to a keyboard, mouse, removable media such as memory sticks, data stored in scanners, cameras, or other sources connected via Bluetooth, infrared and other wireless or wired connections. Data received from external input sources 100 may be first stored in temporary storage such as RAM 104. Alternatively, data received from external input sources 106 may be stored in permanent storage devices 102 for later use. Permanent storage devices 102 may include but are not limited to removable drives such as floppy drives, network or internet storage such as Storage Area Network (SANs) or Network-attached Storage (NAS), local hard disk drives, Redundant Array of Independent Disks (RAID) etc. Data necessary for basic operation of a computing device such as Basic Input Output Services (BIOS) may be stored in permanent Read Only Memory (ROM). System memory or main memory is usually temporary storage (usually in the form of RAM 104) used to store information such as programs and data temporarily while the CPU is using them. RAM 104 can be accessed at very high speeds, which makes it suitable for applications. Whether data is accessed from permanent storage devices 102 such as a hard drive or an external data source 100 such as a keyboard, most data is usually first stored in RAM 104. The CPU may store frequently used data from the RAM in cache 106, and may store certain instructions and data in CPU register file 108.

RAM 104 may be implemented using Dynamic Random Access Memory (DRAM) cells. Virtual memory is another form of temporary storage. It uses the hard disk to simulate more RAM than actually exists. It is addressable storage space available to the user of a computer system in which virtual addresses are mapped into real addresses. Virtual memory may be implemented in software only, but may also use virtual memory hardware to improve efficiency. Temporary storage such as RAM 104 is faster than permanent storage devices 102 but slower than other temporary storage devices such as the Level 1 (L1) and Level 2 (L2) caches and the CPU register file 108. L1 cache is usually memory built into the CPU chip or packaged within the same module as the chip. Also known as the "primary cache", an L1 cache is the memory closest to the CPU. L2 cache is usually external to the CPU chip and is typically located on the system motherboard. The L2 cache is also known as a "secondary cache". The L2 cache usually channels data to the L1 cache. If the L2 cache is also contained on the CPU chip, then memory on the external motherboard may be used as a Level 3 (L3) cache. The L3 cache may be used to channel data to the L2 cache, which in turn channels data to the L1 cache, which feeds the CPU register 108 at the top of the memory hierarchy. The CPU register 108 itself can be considered the smallest, fastest cache in the system, and it is usually scheduled in software, typically by a compiler, as it allocates registers to hold values retrieved from RAM 104.

Data transfer latency to the CPU usually decreases exponentially from the bottom of the pyramid towards the top. For example, the L1 cache is faster than the L2 cache which in turn is faster than RAM 104. The cost of data storage devices usually increases from the bottom of the pyramid towards the top. Thus the L1 cache is more expensive than L2 cache which in turn is more expensive than RAM 104. Embodiments of the invention allow reduction of memory size while maintaining a similar level of performance as that of a larger memory. This results in considerable savings in cost and valuable computational real estate. The memory hierarchy shown in FIG. 1 is not limited to computer systems and is applicable to a variety of computational devices such as PDAs, cell phones, etc.

Figure 2:
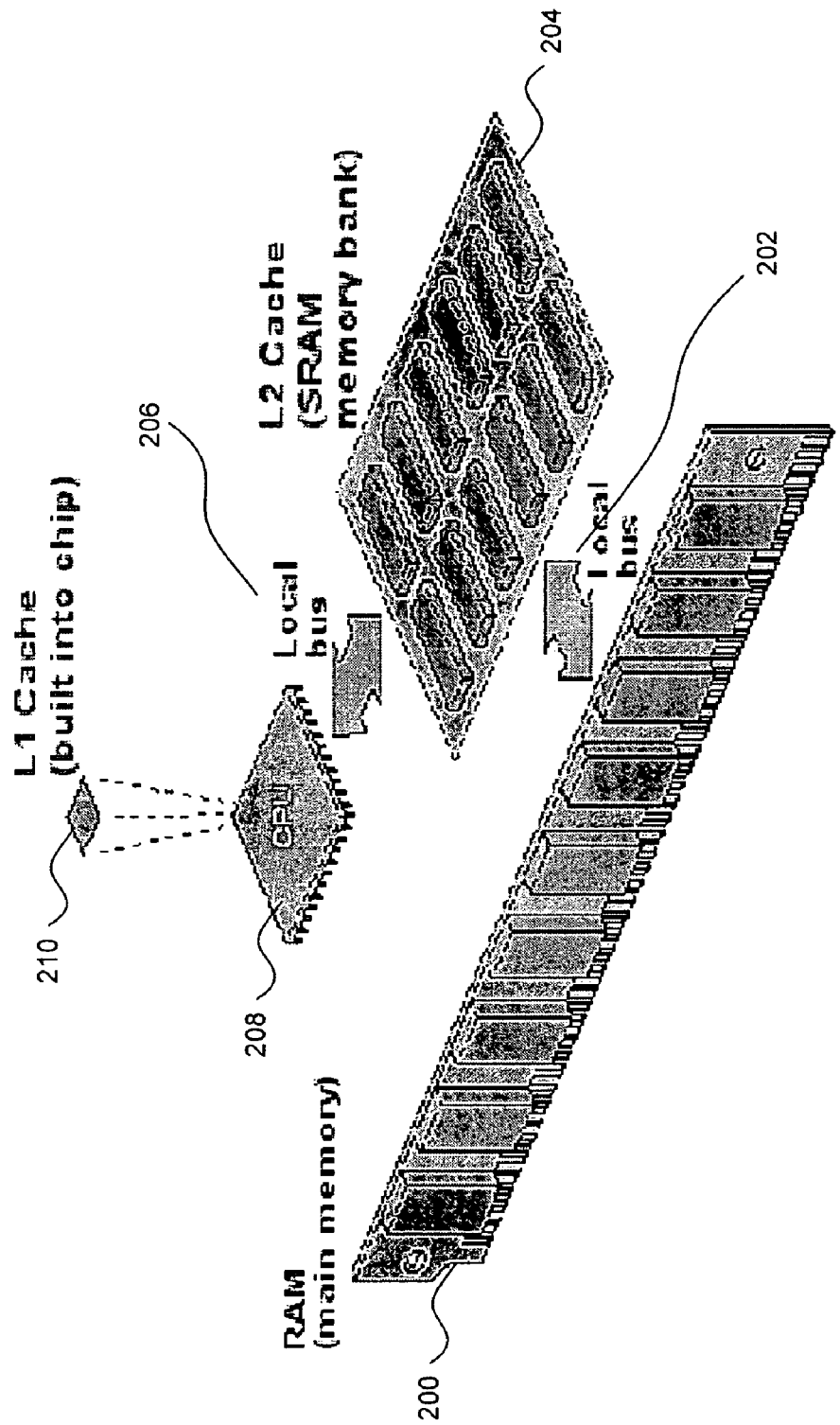
FIG. 2 illustrates an example subset of a memory hierarchy.

FIG. 2 illustrates an example subset of a memory hierarchy. It comprises main memory or RAM 200, a L2 cache 204, a L1 cache 210 built into the CPU chip 208, a local bus 202 to transfer data between the RAM 200 and the L2 cache 204 and a local bus 206 to transfer data between the L2 cache 204 and the CPU 208. The RAM 200 is usually in the form of a PCI card (populated with memory banks) that can be interfaced with the system motherboard by inserting it into a corresponding PCI slot. The RAM 200 usually receives data from storage devices lower in the memory hierarchy such as the hard disk. The RAM 200 transfers data requested by the CPU 208 to the L2 cache 204 via local bus 202. The L2 cache 204 usually comprises of Static Random Access Memory (SRAM) chips located on the system motherboard. The L2 cache 204 transfers data received from the RAM 200 to the L1 cache 210 in the CPU chip 208 via local bus 206. The CPU 208 may write new data or update existing data in one of the levels of the memory hierarchy by transferring data directly to the lower level memory or via the L1 cache 210, L2 cache 204 and RAM 200. Different levels of the memory hierarchy are updated according to the write policy and cache coherency protocols in use by a specific implementation of the memory hierarchy. Cache architectures and means to access caches are discussed in more detail below.

Caches

A cache is usually a collection of data duplicating original values stored elsewhere or computed earlier, where the original data is expensive (usually in terms of access time) to fetch or compute relative to reading the cache. Caches are used by the CPU to reduce the average time to access memory. The cache is a smaller, faster memory which stores copies of the data from the most frequently used main memory locations. Once the data is stored in the cache, future use can be made by accessing the cached copy rather than re-fetching or re-computing the original data, so that the average access time or latency is lower. As long as most memory accesses are to cached memory locations, the average latency of memory accesses will be closer to the cache latency than to the latency of main memory.

Caches have proven extremely effective in many areas of computing because access patterns of typical computer applications usually have locality of reference. There are several types of localities of reference such as temporal, spatial and sequential locality. Temporal locality implies that a memory location that is referenced at one point in time will be referenced again sometime in the near future. Spatial locality implies that the likelihood of referencing a particular memory location is higher if a memory location near it was just referenced and sequential locality means that memory is usually accessed sequentially. Based on the principles of locality of reference, most caches store multiple blocks of sequential memory for a period determined by the cache architecture even though only a particular block was requested.

FIG. 3 illustrates an example of an address used to access data in a cache. The address 300 is usually divided into a tag 306, index 304 and offset 302. In this example the address 300 comprises 32 bits. If each data location in a cache stores a word (where a word has four bytes), then, the least significant 2 bits of the address may be used as a "byte offset" 302. The byte offset may be used to identify a particular byte in a word. If the cache is assumed to have 1024 entries (a 1 MB cache), then the next 10 bits of the address after the byte offset 302 will be allocated to the "index" 304 which identifies the cache entry containing the desired data value. Lastly, the remaining 20 bits of the 32 bits after allocating bits for the byte offset 302 and the index 304 bits are allocated to the "tag" 306 which is compared to the corresponding tag of an entry identified by the index 304 to determine whether the entry in the cache corresponds to the requested address 306. The address partitions presented in FIG. 3 serve as an example should not be used to limit the scope of the invention in any way.

FIG. 4 illustrates an example cache architecture comprising a data cache 400, a tag cache 402 including dirty bits 404, presence bits 406 and valid bits 408, a comparator 410, an AND gate 412 and inverters 414. The cache has 1024 entries and is accessed using the address 300 shown in FIG. 3. To access a particular entry, 10 bits of index 304 are used to identify the corresponding tag in the tag cache 402 as shown. Next, 20 bits of tag 306 are compared to 20 bits of tag 416 stored in the tag cache 402 to determine if the respective data entry corresponds to that requested by address 300. The tag entry 416 also has a valid bit 418 to indicate if the entry contains valid data. For instance, when on system startup, the data cache 400 and tag cache 402 will be empty and the tag fields will contain invalid data. Even after executing multiple instructions, the tag fields of tag cache 402 might still be empty or contain an outdated or invalid entry. The valid bit helps identify these cases where the entry might be invalid. In addition to the valid bit, presence bit 420 is used to indicate if the cache has a copy of the data corresponding to address 300 in a higher level of the memory hierarchy. In this example, the dirty bit 422 is used to indicate whether the entry in the higher level of the memory hierarchy is more recent then the entry in the current level. For example, if the level accessed is the L2 cache then the presence bit 420 may used to determine if the desired data entry is also present in the L1 cache. The dirty bit 422 can be used to indicate whether the entry in the L1 cache is more recent than the entry in the L2 cache. Thus, if the L2 cache is accessed for a data value, the presence and dirty bits

406, 404 can be used to determine if there is a more recent entry in the L1 cache and thereby expedite data transfer by using the L1 cache.

To determine if the requested entry in the cache is valid, is absent in an upper level of the memory hierarchy and is the most recent value in the memory hierarchy, the results of the tags compared by comparator 410, the valid bit 418, and the inverse of the presence and dirty bits obtained via inverters 414 are fed into AND gate 412. If the entry is valid and there isn't a duplicate or more recent entry in a higher cache level, then it is a hit and the corresponding data value in data cache 400 may be accessed. Table 1 shown below lists possible values of the valid, presence and dirty bits.

TABLE 1

Values of the valid, presence and dirty bits.

|  | 0 | 1 |
|---|---|---|
| Valid (V) | Data entry is invalid | Data entry is valid |
| Presence(P) | Data is not present in an upper level of the memory hierarchy | Data is present in an upper level of the memory hierarchy |
| Dirty (D) | Data in upper level of the memory hierarchy is not the most recent | Data in upper level of the memory hierarchy is the most recent |

The example shown in FIG. 4 has a separate tag cache 402 and data cache 400. However, in other examples the tag and data cache 402, 400 might be combined.

In general, when the processor wishes to read or write a location in main memory, it first checks whether the data from that memory location is in one of the caches such as the L1 and L2 caches. This may be accomplished by comparing the address of the memory location to all tags in the cache that might contain that address. If the processor finds that the memory location is in the cache, then a cache hit has occurred, otherwise it is a cache miss. In the case of a cache hit, the processor can immediately read or write the data in the cache line. The proportion of accesses that result in a cache hit is known as the hit rate, and is a measure of the effectiveness of the cache.

In the case of a cache miss, generally, most caches allocate a new entry, which comprises the tag just missed and a copy of the data from memory. The reference can then be applied to the new entry just as in the case of a hit. Misses are slow because they require the data to be transferred from main memory, hard disk or other device from the lower level of the pyramid. This transfer incurs a delay since data transfer from the lower levels of the memory hierarchy is much slower than the cache.

Cache size is usually limited, and if the cache is full, the computer decides which items in a cache are to be kept and which to be discarded to make room for new items. The heuristic that it uses to choose the entry to evict is usually referred to as the "replacement policy". Replacement policies are optimizing instructions that a computer program can follow to manage a cache of information stored on the computer. The replacement policy must predict which existing cache entry is least likely to be used in the future. Some common replacement policies are the Least Recently Used (LRU) and the Least Frequently Used (LFU) algorithms. LRU discards the least recently used items first. This requires keeping track of what was used and when which can be done using one or more bits associated with an entry. LFU counts how often an item is needed. Those that are used least often are discarded first. Other replacement policy algorithms may consider factors such as the latency involved with retrieving an item. Size of an item may also be a factor where the cache may discard large items in favor or smaller ones or vice versa. Some caches keep information that expires (e.g. a news cache, a DNS cache, or a web browser cache). The replacement policy may choose to discard items because they are expired. The size and speed of a cache and the latency involved with data transfer may also guide the replacement policy.

When data is written to the cache, it must at some point be written to main memory as well. The timing of this write is controlled by what usually referred to as the write policy. In a write-through cache, every write to the cache causes a write to main memory and therefore the main memory always has the latest data. Alternatively, in a write-back cache, writes are not immediately mirrored to memory. Instead, the cache tracks which locations have been written over (these locations are marked with a dirty bit). The data in these locations is written back to main memory when that data is evicted from the cache. For this reason, a miss in a write-back cache will often require two memory accesses to service the request. There are intermediate policies as well. The cache may be write-through, but the writes may be held in a queue temporarily, usually so that multiple stores can be processed together which can reduce bus turnarounds and improve bus utilization.

The data in main memory being cached may be changed by other entities within or external to the system, in which case the copy in the cache may become out-of-date or stale. Alternatively, when the CPU updates the data in the cache, copies of that data in other caches will become stale. Communication protocols between the cache managers which keep the data consistent are commonly known as cache coherency protocols.

In some processors the data in the L1 cache may also be in the L2 cache. These caches are called "inclusive" caches because the data at a higher level of the memory hierarchy use a subset of the next lower level in the memory hierarchy. Some implementations of inclusive caches may guarantee that all data in the L1 cache is also in the L2 cache. One advantage of strictly inclusive caches is that when external devices or other processors in a multiprocessor system wish to remove a cache line from the processor, they need only have the processor check the L2 cache. In cache hierarchies which do not enforce inclusion, the L1 cache must be checked as well. In inclusive caches a larger cache can use larger cache lines, which reduces the size of the secondary cache tags. If the secondary cache is an order of magnitude larger than the primary, and the cache data is an order of magnitude larger than the cache tags, this tag area saved can be comparable to the incremental area needed to store the L1 cache data in the L2 cache.

Some processors use "exclusive" caches. Exclusive caches guarantee that the data is present in at most one of the levels of the hierarchy. For example, data may be guaranteed to be in at most one of the L1 and L2 caches. The advantage of exclusive caches is that they store more data. When the L1 misses and the L2 hits on an access, the hitting cache line in the L2 is exchanged with a line in the L1. In a similar scenario, an inclusive cache may copy the data from L2 to L1.

The replacement policy decides where to place copy of a particular entry from main memory in the cache. If the replacement policy allows any entry in the cache to hold a copy of the data then the cache is referred to as a fully associative cache. If each entry in main memory can go in just one place in the cache, the cache is referred to as a direct mapped cache. Many caches implement a mix between a fully associative and a direct mapped cache commonly referred to as a set associative cache. For example, in a L1 2-way set associative cache, any particular location in main memory can be cached in either of two locations in the L1 data cache. Since each location in main memory can be cached in either of two locations in the cache, to determine which of the two locations hold the data, the least significant bits of the memory location's index is used as the index for the cache memory with two way entries for each index. The tags stored in the cache do not have to include that part of the main memory address which is specified by the cache memory's index. Since the cache tags have fewer bits, they take less area and can be read and compared faster.

Other cache configurations may also be used such as the skewed cache, where the index for way 0 is direct mapped but the index for way 1 is determined by using a hash function. A hash function generally has the property that addresses that conflict with the direct mapping do not conflict with the hash function, and so it is less likely that a program will suffer from unexpectedly many conflict misses due to a pathological access pattern.

A victim cache is a cache used to hold blocks evicted from a CPU cache due to a conflict or capacity miss. The victim cache lies between the main cache and its refill path, and only holds blocks that were evicted from that cache on a miss. This technique is used to reduce the penalty incurred by a cache on a miss.

A trace cache is a mechanism for increasing the instruction fetch bandwidth by storing traces of instructions that have already been fetched. A trace cache stores instructions either after they have been decoded, or as they are retired. This allows the instruction fetch unit of a processor to fetch several basic blocks, without contemplating branches in the execution flow.

Some computer systems use a Harvard architecture which calls for separate caches for instructions and data. Separate instruction and data memories and/or caches prevent a program from altering the instructions.

Example Embodiments

In conventional cache system design utilization effectiveness can be low. This may happen because it is an inclusive cache where a lower level in the memory hierarchy might contain a copy of data from a higher level. For example, the L2 cache can contain duplicate information that is readily available in a L1 cache. Duplicate information results in waste of the L2 cache space. If exclusive caches, which do not hold redundant copies of data, are used then there are other overheads involved. For example, in an exclusive cache environment, when there is a miss in the L1 cache and a hit in the L2 cache on a data access request, the entry which hits in the L2 cache is exchanged with an entry in the L1 cache resulting in a processing overhead. Embodiments of the invention, as explained below, overcome data redundancy while reducing cache memory size without compromising the effectiveness of a large cache which may operate in an inclusive environment.

In an embodiment there is an uneven mapping between the tag and data entries of an L2 cache i.e. one or more tag entries does not have a corresponding data entry. For a tag and corresponding data that have to be written to a L2 cache where all tag entries with corresponding data entries are occupied, if a more recent data value for a stored tag is present in the L1 cache, then only information pointing to the more recent or duplicate data in the L1 cache (such as a tag, dirty bit, presence bit and valid bit) is stored in the L2 cache. The tag, dirty bit, presence bit and valid bit that point to the corresponding data in the L1 cache can be stored in tag entries in the L2 cache that do not have corresponding data entries. This results in considerable saving in valuable chip real estate since not all tag entries in the L2 cache need to have corresponding data entries.

In embodiments of the present invention, tag entries and their corresponding data entries are referred to as "non-pseudo tag entries" and "non-pseudo data entries". Non-pseudo tag entries and non-pseudo data entries may be collectively referred to as "non-pseudo entries". Tag entries that do not have corresponding data entries are referred to as "pseudo tag entries".

In an example embodiment, during operation, to write a new tag and corresponding new data value to a L2 cache, it is determined if any non-pseudo tag and data entries are available. If non-pseudo entries are available then the new tag is written to a non-pseudo tag entry and the new data is written to a non-pseudo data entry. If it is determined that all non-pseudo tag and data entries are occupied, then it is determined if data in one of the non-pseudo data entries had a most recent or duplicate data in the L1 cache. If it is determined that a non-pseudo data entry has a more recent or duplicate data in the L1 cache, that non-pseudo data entry and its corresponding non-pseudo tag entry are vacated by deleting the data in the non-pseudo data entry and the tag in the corresponding non-pseudo tag entry. The new tag and new data are written to the vacated non-pseudo tag entry and the non-pseudo data entry.

For the vacated L2 non-pseudo tag and data entry, the L2 cache keeps track of the more recent or duplicate data present in the L1 cache by writing the tag of the deleted non-pseudo tag entry and bits such as the presence bit, valid bit and dirty bit to a L2 cache pseudo tag entry. The presence bit is used to indicate that the L1 cache has the data corresponding to the tag in the L2 pseudo tag entry, the dirty bit is used to indicate that the L1 cache has the most recent data and the valid bit is used to indicate that there is no data corresponding to the tag in the L2 cache pseudo tag entry. When the L2 cache is accessed using a tag corresponding to the data deleted from the non-pseudo data entry, the pseudo tag entry points to the more recent or duplicate data in the L1 cache by using the tag, presence bit, dirty bit and valid bit stored in the pseudo tag entry.

Figure 5A:
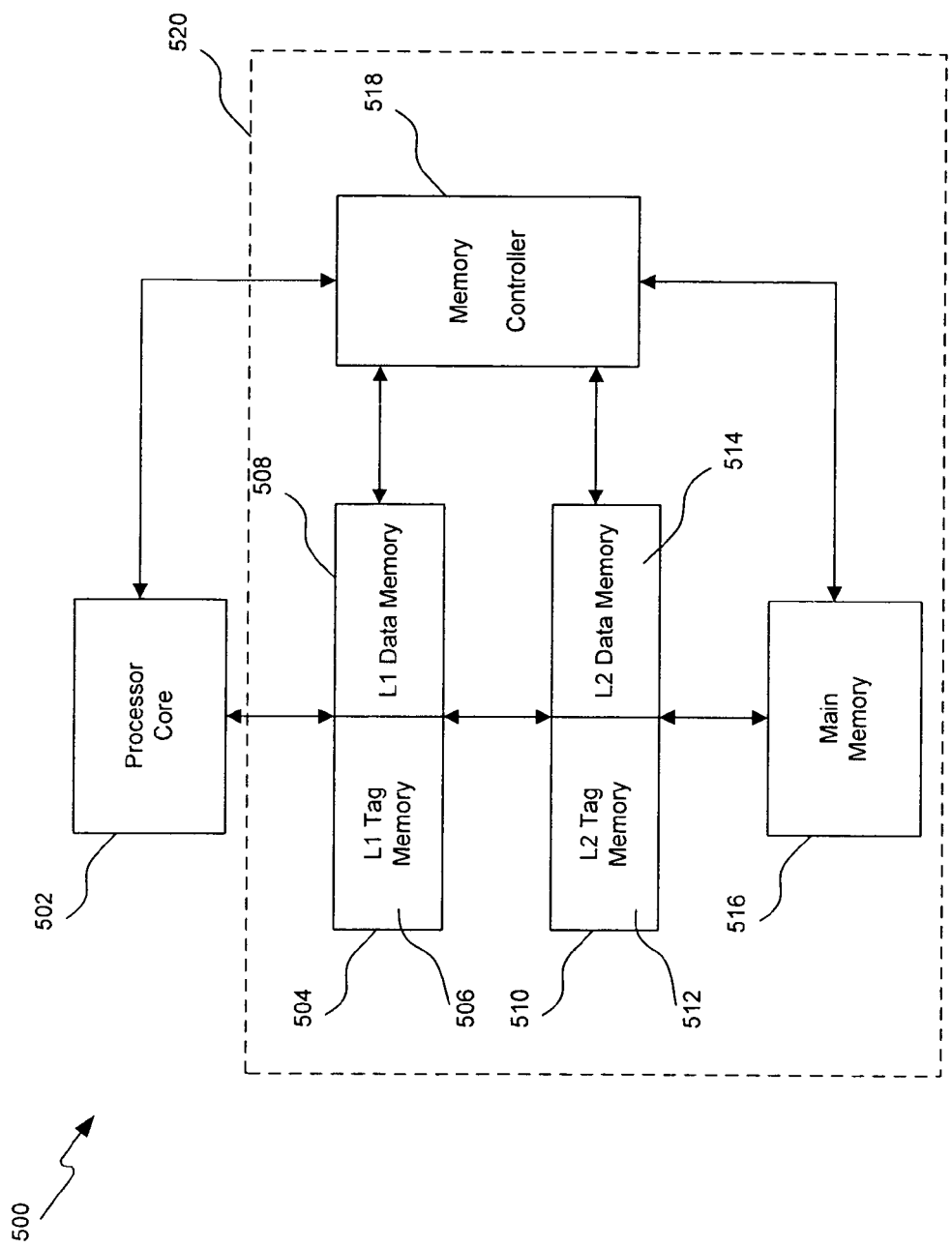
FIG. 5A illustrates an exemplary embodiment of the invention.

FIG. 5A illustrates an example processing system 500 according to an embodiment of the invention. Processing system 500 includes a processor core 502 coupled to L1 cache 504 and memory controller 518 of memory system 520. L1 cache 504 includes L1 tag memory 506 and L1 data memory 508. L1 cache 504 is coupled to L2 cache 510 comprising L2 tag memory 512 and L2 data memory 514. L2 cache 510 is coupled to main memory 516. Memory controller 518, L1 cache 504, L2 cache 510 and main memory 516 comprise memory system 520. In the present embodiment, memory controller 518 is coupled to processor core 502, L1 cache 504, L2 cache 510 and main memory 516. Memory controller 518 manages and transfers data between processor core 502, L1 cache 504, L2 cache 510 and main memory 516. In alternate embodiments, L1 cache 504, L2 cache 510 and main memory 516, each have their own respective memory controllers (not shown) that in combination perform the same functions as memory controller 510. In this example, for the purpose of explanation, memory controllers for L1 cache 504, L2 cache 510 and main memory 516 have been combined into memory controller 518 as an abstraction. Further ways of partitioning memory controller 510 or implementing functionality of memory controller 510 are also within the scope of the present invention. Such further ways of partitioning or implementing will become apparent to persons skilled in the relevant art(s) from the teachings herein. In this example, L1 cache 504, L2 cache 510 and main memory 516 are part of an inclusive memory hierarchy. In alternate embodiments memory system 520 may include other memory such as hard disk drives and hard disk drive controllers.

L2 tag memory 510 includes L2 tag entries (not shown) and L2 data memory 514 includes L2 data entries (not shown). In the present embodiment, there is an uneven mapping between the L2 tag entries and the L2 data entries such that there are more L2 tag entries than L2 data entries. Tag entries and data entries are physical storage locations implemented in RAM. Data entries are typically larger than tag entries in most memory systems. Therefore not having data entries for some tag entries results in a smaller chip size.

During operation, on a write request, if there is a hit on a copy in the L1 cache 504 that has a corresponding copy in the L2 cache 510 whose dirty bit is set, then the L1 copy is updated and no action is required in the L2 cache. If the processor receives a write hit on a clean copy in the L1 cache 504 then the L1 cache 504 copy is updated and the dirty bit is set for the corresponding copy in the L2 cache 510 to indicate that the L1 cache 504 copy is more recent. If the L1 cache 504 is full and a new data entry has to be made then, the memory controller 518 evicts an existing data entry in L1 cache 504 to make space for a new data entry. If the evicted entry is clean, then it can be overwritten by the new data entry. If the evicted entry is dirty, then the evicted data is written back to the L2 cache 510 and the corresponding presence and dirty bits are updated for that entry in L2 cache 510 to indicate that L1 cache 504 does not have the data value and that the data in L2 cache 510 is more recent or a duplicate. The entry to be evicted may be chosen by LRU, LFU or any other replacement algorithm.

During operation, when memory controller 518 receives a tag and data value to be written to L2 cache 510, memory controller 518 determines if there are any L2 tag entries with corresponding data entries available. If there is a L2 tag entry with a corresponding data entry available, then memory controller 518 writes the tag to the vacant L2 tag entry and the data to the corresponding vacant L2 data entry. If there are no vacant L2 tag entries with corresponding L2 data entries available, memory controller 518 determines whether there is a data entry in L2 cache 510 that has the same or more recent data value present in L1 cache 504. Memory controller 518 may determine this by comparing the tags in the L2 tag entries with tags stored in the L1 tag memory 506 or by checking presence and dirty bits associated with L2 tags. If such a data entry is identified in L2 cache 510, memory controller 518 transfers the tag associated with the located data entry to a pseudo tag entry in L2 tag memory 512. After transferring the tag, memory controller 518 deletes the transferred tag and the corresponding data and thereby vacates a tag entry and data entry to store the new tag and new data. For the tag that is moved to a pseudo tag entry, the associated presence bit is modified by memory controller 518 to indicate that the corresponding entry is present in the L1 cache 504 and the dirty bit is modified to indicate that the L1 cache 504 has more recent or duplicate data and the valid bit is modified to indicate that there is no valid data for that tag present in the L2 cache 510. On a request from processor 502 for the data that was deleted from the L2 cache 510, the memory controller 518 uses the presence, valid and dirty bits of the tag corresponding to the data deleted from L2 cache 510 and determines that the more recent or duplicate of the deleted data is present in the L1 cache 504. Memory controller 518 fetches the data from L1 cache 504 and provides it to processor core 502.

In the event that a more recent or duplicate data for any of the data entries in L2 cache 510 is not found by memory controller 518, memory controller 518 writes back data from one of the data entries in L2 cache 510 to main memory 516 to create space for the new data. Similarly, if all pseudo tag entries in L2 cache 510 are also occupied, then memory controller 518 writes back data from one of the data entries of L2 cache 510 to main memory 516 to create space for the new tag and new data.

Figure 5B:
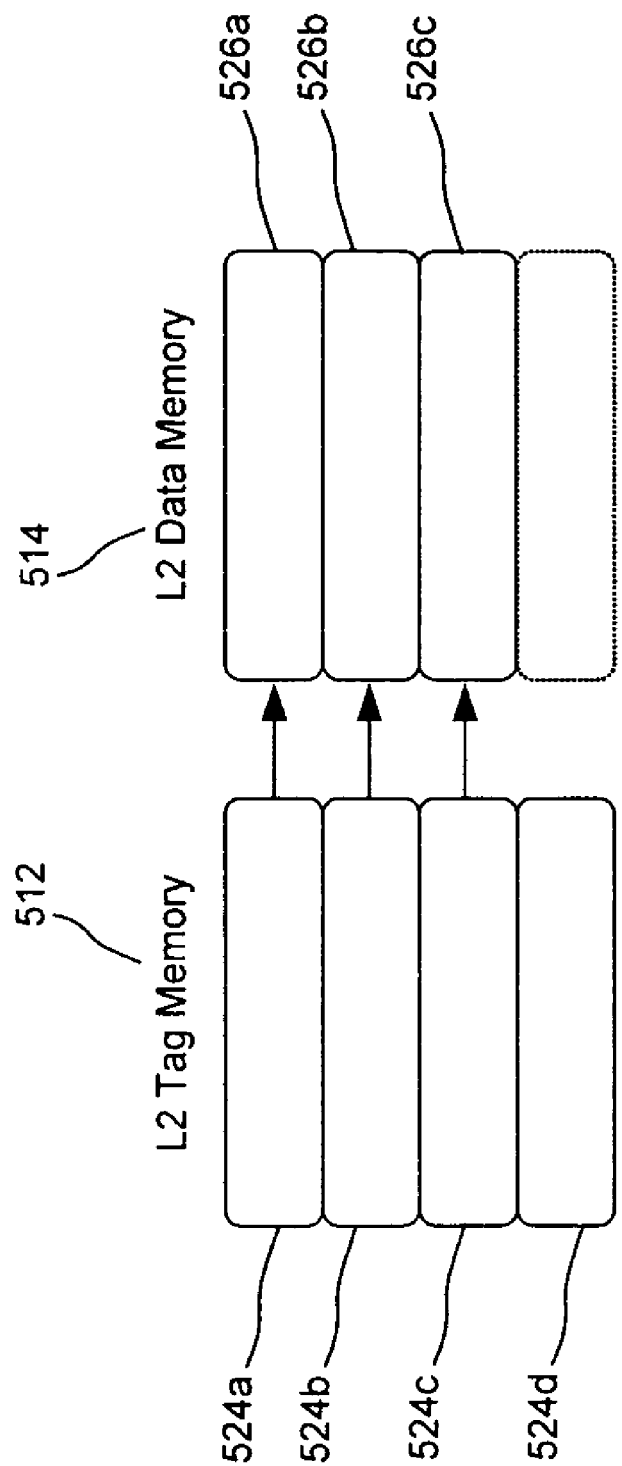
FIG. 5B illustrates the L2 tag memory and L2 data memory of the embodiment in FIG. 5A in further detail.

FIG. 5B illustrates L2 tag memory 512 and L2 data memory 514 from FIG. 5A in further detail. In this example, L2 cache tag memory 512 includes four tag entries 524*a-d* and L2 cache data memory 514 includes three data entries 526*a-c*.

As seen in FIG. 5B, tag entries 524*a-c* in tag memory 512 have corresponding data entries 526*a-c* in data memory 514 but tag entry 524*d* does not have a corresponding data entry i.e. tag entry 524*d* does not have a corresponding physical location to store a tag's corresponding data value. Tag entry 524*d* is a pseudo tag entry whereas tag entries 524*a-c* are non-pseudo tag entries with corresponding non-pseudo data entries 526*a-c*. Typically, data memory 514 is comparatively much larger than tag memory 512. By removing one or more of the data entries in data memory 514 considerable reduction in storage space is achieved. In the example shown in FIG. 5B, by not having a data entry corresponding to tag entry 524*d*, data memory 502 size is reduced by 25% than if a data entry corresponding to tag entry 524*d* is present.

Tag entry 524*d* is used for keeping track of deleted data from data entries 526*a-c* that are cached in L1 cache 504. During operation, memory controller 518 receives a new tag and a new data value to be stored in L2 cache 510. If all non-pseudo tag entries 524*a-c* and non-pseudo data entries 526*a-c* are unavailable, then space can be created for the new tag and new data values by deleting one of the data in the data entries 526*a-c* that has a more recent or duplicate data in L1 cache 504.

In an example, a tag and data may have to be written to L2 cache 510 when processor core 502 has a read miss requiring a fetch from the main memory 516. The L2 cache 510 may also be written to when the L1 cache 504 has to write back a dirty entry. If the non-pseudo tag entries 524*a-c* and corresponding non-pseudo data entries 526*a-c* in the L2 cache 510 are available, then the L2 cache 510 writes the tag to one of the available tag entries in 524*a-c* and writes the data to one of the available data entries 526*a-c*. If non-pseudo entries are occupied then one of the non-pseudo entries may be vacated by locating a non-pseudo entry, for example, non-pseudo tag entry 524*b*. Non-pseudo tag entry 524*b* is selected if its dirty and presence bits (not shown) are set thereby indicating that L1 cache 504 has a more recent or duplicate of data stored in non-pseudo data entry 526*b*. The tag of the identified non-pseudo tag entry 524*b* is moved to pseudo tag entry 524*d* and data in non-pseudo data entry 526*b* is deleted since a more recent or duplicate data exists in L1 cache 504. For the tag moved to pseudo tag entry 524*d*, the presence bit is modified to indicate that corresponding data is in L1 cache 504 and, the dirty bit is modified to indicate that L1 cache 504 has a more recent or duplicate data, and the valid bit is modified to indicate that there is no valid data in L2 cache 510 corresponding to pseudo tag entry 524*d*. By modifying the presence, valid and dirty bits corresponding to the tag in pseudo tag entry 524*d*, memory controller 518 can track the most recent data entry corresponding to the tag in pseudo tag entry 524*d*. If pseudo tag entry 524*d* is occupied then space may be created by memory controller 518 by flushing the contents of one of the non-pseudo entries in L2 cache 510 back to main memory 518.

Although the above examples in FIGS. 5A and 5B use inclusive L1 and L2 caches as examples, embodiments of the invention are not limited to inclusive memory systems or to L1 and L2 caches.

Figure 6:
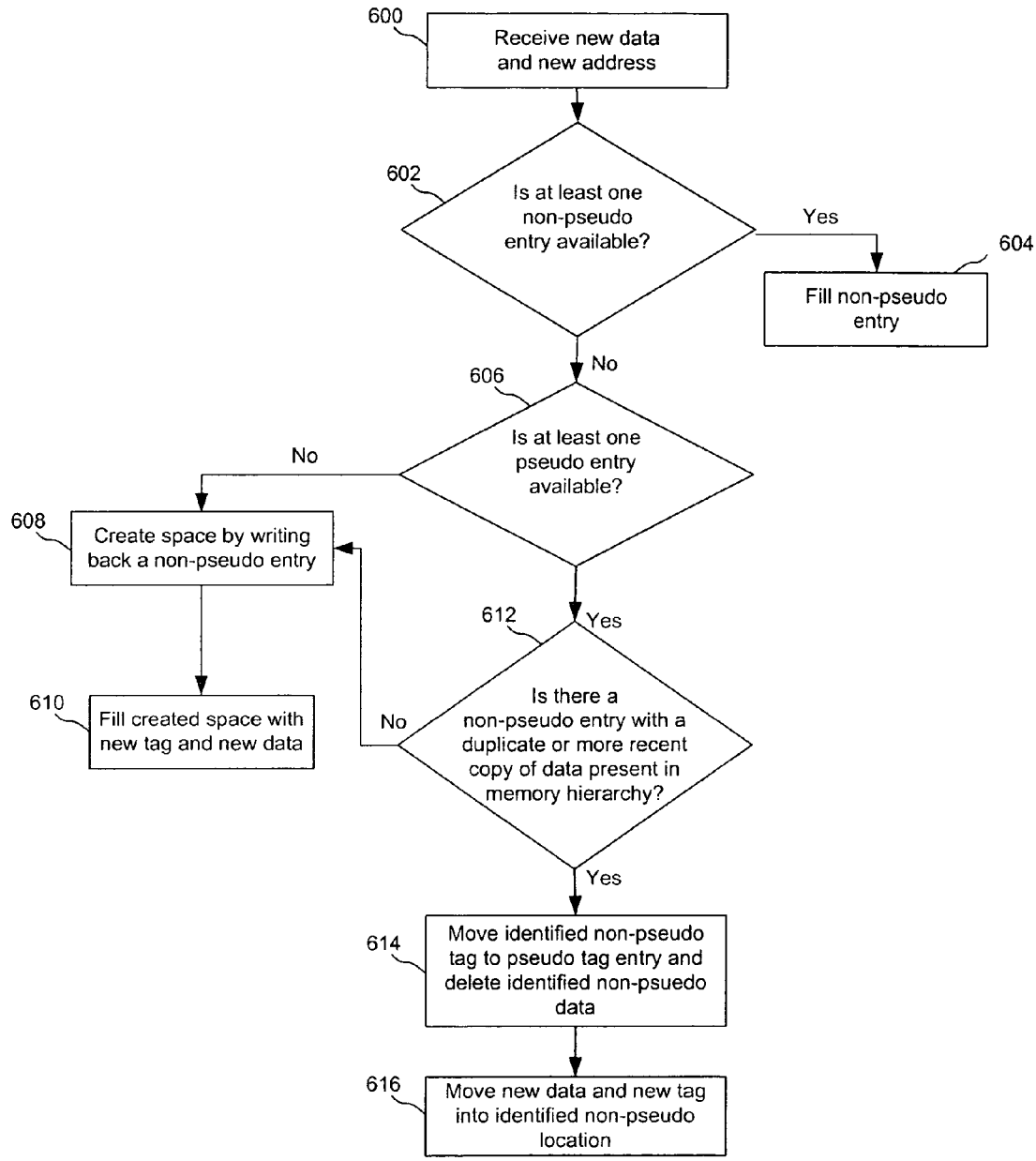
FIG. 6 illustrates an exemplary flowchart according to an embodiment of the invention.

FIG. 6 illustrates an exemplary flowchart according to an embodiment of the invention. These steps may be performed in hardware, software or firmware. For example, these steps may be performed by a memory controller such as memory controller 518, or firmware running on a CPU or instructions hardwired in circuitry.

In step 600, a new tag and corresponding new data are received by a memory controller from a processor core or another data source in a memory hierarchy.

In step 602, it is determined if there is at least one non-pseudo tag and data entry available in a particular level of a memory hierarchy.

In step 604, if an available non-pseudo entry is identified in step 602, the tag and data received in step 600 are stored in the identified non-pseudo tag and data entries respectively. Corresponding bits associated with the tag such as the dirty bit, valid bit and presence bit are updated in the current and/or other levels of the memory hierarchy.

In step 606, if it is determined that a non-pseudo entry is unavailable in step 602, then, it is determined if there is at least one pseudo tag entry available.

In step 608, if it is determined in step 606 that a pseudo tag entry is unavailable, then, a non-pseudo tag and corresponding data entry is vacated by writing back data from the non-pseudo data entry to a lower level in the memory hierarchy and deleting the tag in the non-pseudo tag entry.

In step 610, the address and data received in step 600 are stored in the non-pseudo entry vacated in step 608.

In step 612, if it was determined that a pseudo entry is available in step 606, then, it is determined if there is a non-pseudo data entry with a more recent or duplicate data in one of the levels in the memory hierarchy. If such a non-pseudo data entry is not present, control passes to step 608. Presence of more recent or duplicate data may be determined by comparing tags stored in non-pseudo tag entries with tags stored in other levels of the memory hierarchy and/or using associated presence, valid and dirty bits.

In step 614, if a non-pseudo data entry with a more recent or duplicate data in one of the levels in the memory hierarchy is identified in step 612, then, the tag stored in the corresponding non-pseudo tag entry is moved to a pseudo tag entry and the data in the non-pseudo data entry is deleted (since a more recent value or duplicate exists in one of the levels of the memory hierarchy).

In step 616, the tag and data received in step 600 are stored in the non-pseudo entry vacated in step 614. The pseudo tag entry which holds the tag corresponding to the deleted data of the non-pseudo data entry keeps track of more recent data or duplicate data in another level of the memory hierarchy by using dirty, valid and presence bits. For example, the dirty bit may be set to indicate that there is a more recent data entry, the presence bit may be set to indicate that the more recent or duplicate data is present in another level of the memory hierarchy and the valid bit may be set to indicate that there is no corresponding data entry in the current level of the hierarchy. The memory hierarchy may be organized as an inclusive hierarchy so that the more recent entry is always stored in a level above the current memory level, e.g. for an L2 cache the more recent entry may be stored in the L1 cache. Although the above algorithm stores only the tag in a tag entry, in some embodiments, the entire address or another identifier for the address may be stored in a tag entry.

Figure 7:
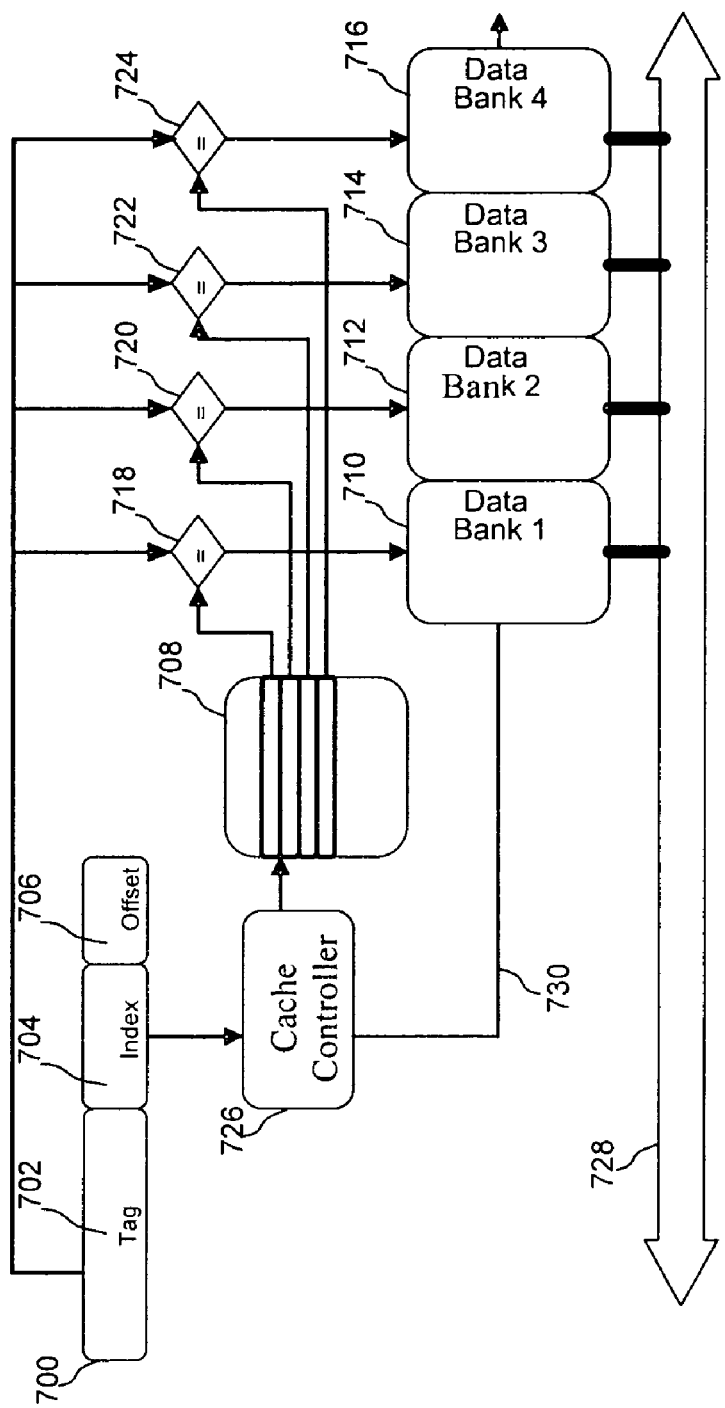
FIG. 7 illustrates an example conventional L2 cache architecture using data banks.

FIG. 7 illustrates an example conventional L2 cache architecture comprising tag RAM 708, a data cache including data banks 710, 712, 714, 716, comparators 718, 720, 722, 724, cache controller 726, data bus 728 and address bus 730. The L2 cache is accessed using address 700 comprising tag 702, index 704 and offset 706. The address 700 is used to access data banks 710, 712, 714 and 716 using address bus 730. The data accessed from one of the data banks 710, 712, 714 and 716 is supplied using data bus 728. In this example the L2 cache is part of an inclusive memory architecture where the L1 cache (not shown) is a subset of the L2 cache and the L2 cache is a subset of the main memory (not shown). When the L2 cache controller 726 receives a processor request for data after a miss on the L1 cache, it provides a copy of the requested data if L2 cache has the data. Otherwise, the L2 cache fetches the data from main memory.

In the example show in FIG. 7, the L2 cache is a 4-way set-associative cache with a 1 MB data cache divided into a set associative scheme of four 256 KB banks 710, 712, 714, 716. When a processor requests data corresponding to, for example, a 32-bit memory address 700, cache controller 726 uses index 704 to access the addressed tag entry in the tag RAM 708. The accessed tag entry in tag RAM 708 has four tags since the desired data entry may be in any one of the four data banks 710, 712, 714, 716. The offset 706 is used to locate the target byte or word in the 64-byte tag entry. Each of the four tags accessed from tag RAM 708 are compared with tag 702 using corresponding comparators 718, 720, 722 and 724. If the comparison results in a hit for one of the data banks 710, 712, 714, 716, then access is enabled to that data bank. In this example of a conventional L2 cache architecture, every entry is the tag RAM 708 has a corresponding entry in one of the data banks 710, 712, 714, 716. Each tag RAM 708 entry contains a tag to address one of data banks 710, 712, 714, 716, a valid bit indicating if the data entry associated with the tag is valid, a presence bit indicating if the data stored in a data entry is also present in the L1 cache, and a dirty bit indicating if there is a L1 cache data that is more recent or a duplicate of the L2 cache data.

Figure 8:
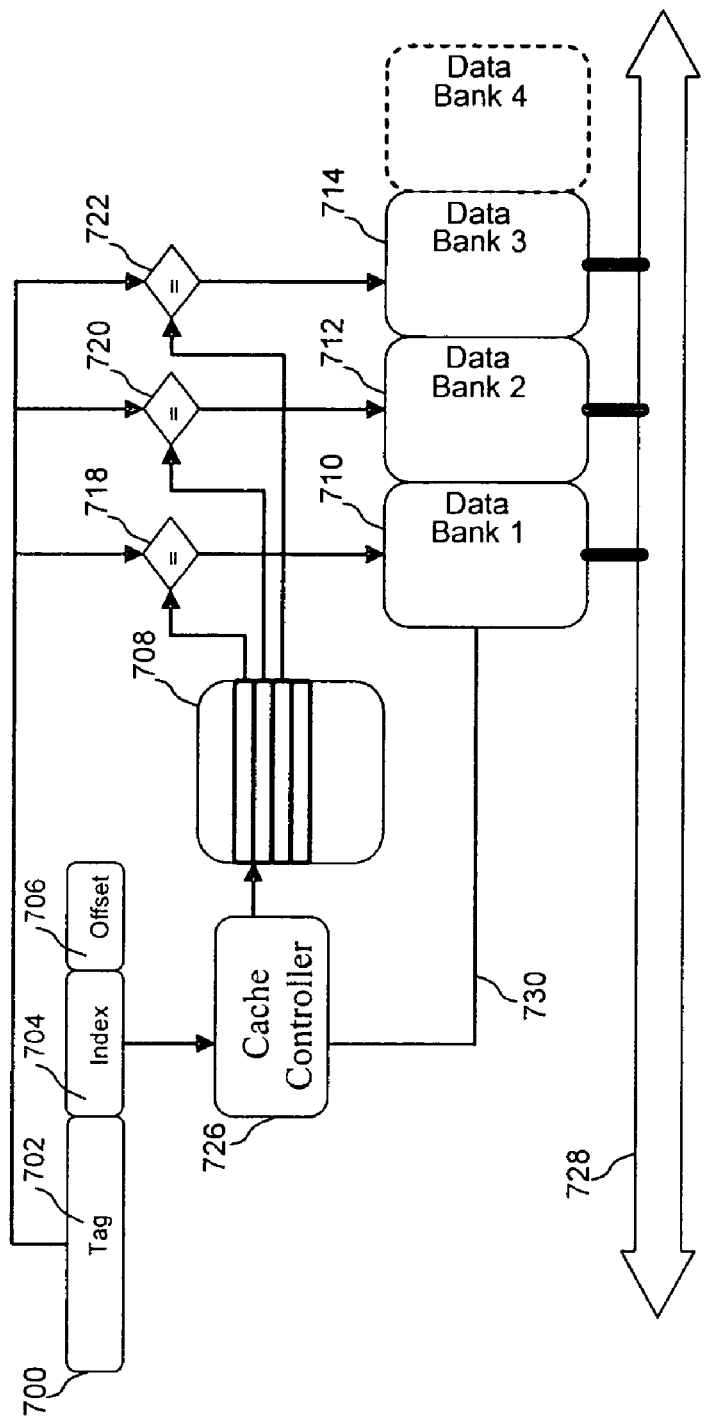
FIG. 8 illustrates the example L2 cache architecture of FIG. 7 adapted according to an embodiment of the invention.

FIG. 8 illustrates the example memory architecture of FIG. 7 adapted according to an embodiment of the present invention. In this embodiment, the fourth data bank 716 and corresponding fourth comparator 724 from the L2 cache shown in FIG. 7 has been removed. The removed data bank 716 is referred to as a "pseudo data bank". Since each data bank is 256 KB, removing data bank 716 reduces the previously 1 MB data cache by 256 KB. Memory banks 710, 712 and 714 are "non-pseudo data banks" and have data entries for corresponding tag entries in tag RAM 708. Every fourth entry in tag RAM 708 is a pseudo tag entry and the tag stored in the pseudo tag entry does not have an associated data entry in the data banks. This pseudo tag entry is used for keeping track of data present in the L1 cache and deleted from the L2 cache. Because of the inclusion property, the L1 copy of data is a duplicate of or is more recent than the copy in the L2 cache. Obsolete copies of data in non-pseudo data banks 710, 712 and 714 that have more recent or duplicate data in the L1 cache can be deleted when space is unavailable in non-pseudo data banks 710, 712 and 714. The tags corresponding to deleted data from the data banks 710, 712 and 714 can be stored in a pseudo tag entry of tag RAM 708.

During operation, if a new data is to be stored in the L2 cache and data entries in data banks 710, 712, 714 are unavailable, cache controller 726 determines if any of the data entries in data banks 710, 712, 714 has a more recent or duplicate data in L1 cache. If more recent or duplicate data is present in the L1 cache, then the corresponding data in one of data banks 710, 712, 714 is deleted and the corresponding tag entry is moved to a pseudo entry of tag RAM 708. The tag in the pseudo tag entry in tag RAM 708 has an associated valid bit that is modified to indicate whether the data entry associated with the tag is valid, a presence bit to indicate whether the data is present in the L1 cache, and a dirty bit to indicate whether there is more recent or duplicate data in the L1 cache. If a more recent or duplicate data for any of the data in data banks 710, 712, 714 is not found in the L1 cache, then one of the data entries in data banks 710, 712, 714 is written back to main memory to create space for the new data.

Embodiments of the invention are also applicable to other memory architectures such as Non-Uniform Memory Architecture (NUMA) and the Symmetric Multi-Processing (SMP) architecture. NUMA is a memory architecture, used in multiprocessor systems, where the memory access time depends on the memory location. Under NUMA, a processor can access its own local memory faster than non-local memory (i.e. memory which is local to another processor or shared between processors). SMP is a multiprocessor computer architecture where two or more identical processors are connected to a single shared main memory. SMP systems allow any processor in the system to work on any task no matter where the data for that task is located in memory. With operating system support, SMP systems can easily move tasks between processors to balance the work load efficiently.

Figure 9:
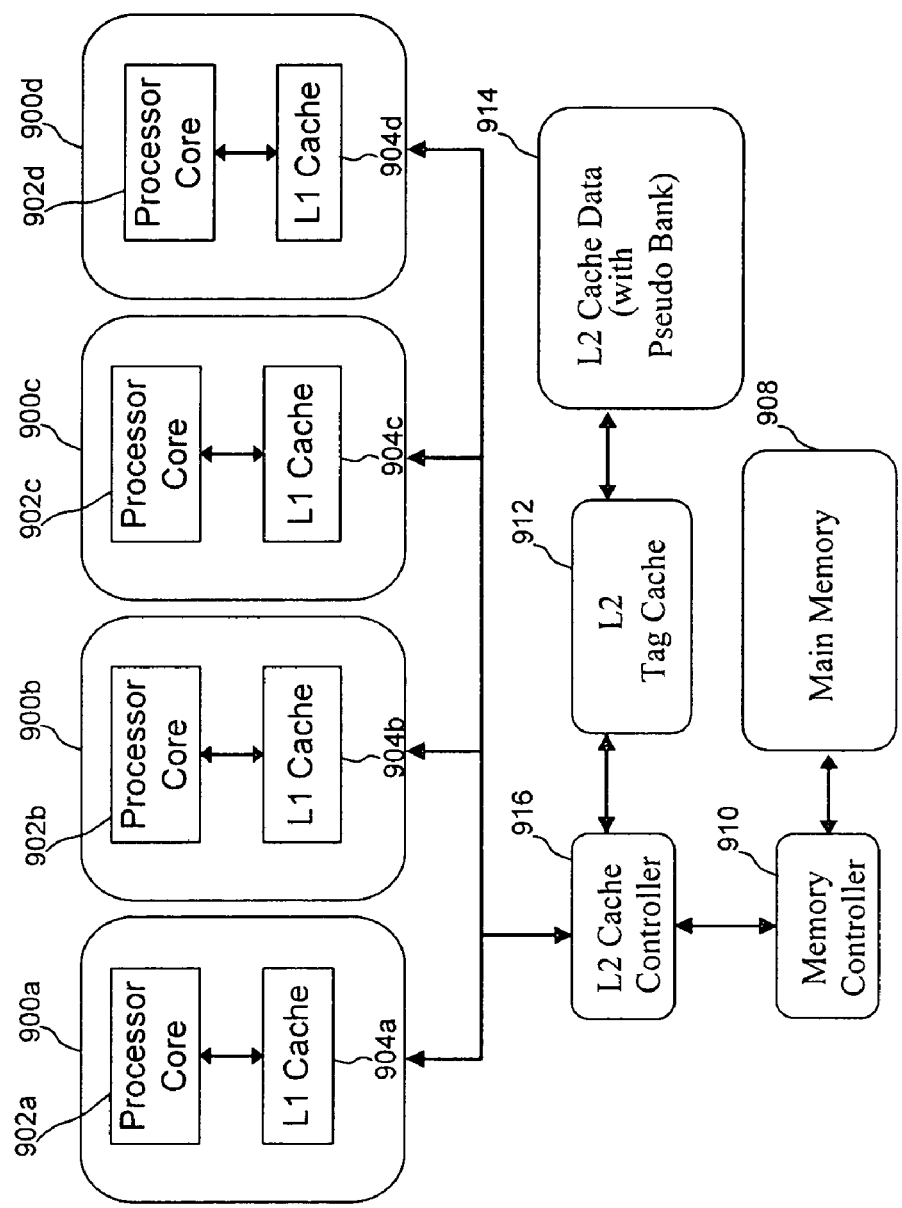
FIG. 9 illustrates a Symmetric Multiprocessor architecture adapted according to an embodiment of the invention.

FIG. 9 shows a SMP architecture adapted according to an embodiment of the invention. The SMP architecture comprises four processors 900*a-d* including corresponding processor cores 902*a-d* and L1 caches 904*a-d*, a shared common main memory 908, main memory controller 910, a shared L2 data cache 914 and L2 tag memory 912 including a L2 cache controller 916.

In the present embodiment, processor cores 902*a-d* and corresponding L1 caches 904*a-d* interface with a common L2 tag cache 912 and a common L2 data cache 914 that includes a pseudo memory bank (not shown) via L2 cache controller 916. Memory controller 910 and L2 cache controller 916 operate in conjunction and may be combined into a single module in an alternate embodiment.

During operation, when data is to be written to L2 data cache 914, if L2 cache controller 916 determines that all non-pseudo entries (not shown) of L2 data cache 914 are occupied, L2 cache controller determines if one of L1 caches 904*a-d* has a more recent or duplicate of any of the data entries (not shown) in L2 data cache 914. If a more recent or duplicate of data is present in one of L1 caches 904*a-d*, then the duplicate or obsolete data is deleted from the identified data entry in L2 data cache 914 and the corresponding tag is copied to a pseudo tag entry (not shown) in L2 tag cache 912. The identified tag entry and data entry in L2 data cache 914 is vacated. If a more recent or duplicate data is not present in any one of the L1 caches 904*a-d*, L2 cache controller 916 operates in conjunction with main memory controller 910 to write back data from one of the data entries of L2 data cache 914 to main memory 908 and create a space for the new data.

L2 cache controller 916 associates four presence bits, one valid bit and one dirty bit with each tag stored in L2 tag cache 912. Each presence bit indicates which of L1 caches 904*a-d* has a more recent or duplicate data corresponding to a tag stored in L2 tag cache 912. The valid bit indicates if the data is valid and the dirty bit is used to indicate whether the data in the L1 cache is more recent. In an n processor SMP system, n presence bits are used to track which of the n L1 caches has a more recent or duplicate of data in an L2 cache.

The terms "CPU" and "processor" and the plural form of these terms are used interchangeably throughout this document to refer to a microprocessor, microcontroller or any other hardware element capable of processing data such as a Digital Signal Processor (DSP or an Analog Signal Processor (ASP). As one skilled in the relevant art(s) would recognize, based at least on the teachings herein, any hardware component that is a sub-system of a data processing system which processes received information after it has been encoded into data by an input sub-system and then processed by the processing sub-system before being sent to the output sub-system where they are decoded back into information can qualify as a processor.

In most cache architectures, the most recent copy of data is maintained in some level of the memory hierarchy like the CPU registers or the L1 cache. By tracking the location of the latest copy a data value, cache coherency can be maintained. In embodiments, the location and status of each cache line may be maintained by using one or more bits. For example, a bit may be used to indicate if a copy of the L2 data exists in the L1 cache and if the L1 copy is dirtier than the data in the L2 cache.

Embodiments of the invention can operate with any type of cache architecture or protocol including but not limited to those mentioned above. For example, the cache can either be an L1, L2, L3, trace or victim cache, be inclusive or exclusive or follow an LRU replacement policy.

Similar to the L3 cache there may be other levels of memory between the CPU and permanent storage/temporary storage and input devices. The relationship between the L2 and L1 caches as presented in embodiments may be applied between any level in the memory hierarchy.

The embodiments presented above are described in relation to memory architectures and caches. The invention is not, however, limited to caches and memory architectures. Based on the description herein, a person skilled in the relevant art(s) will understand that the invention can be applied to other applications.

Figure 10:
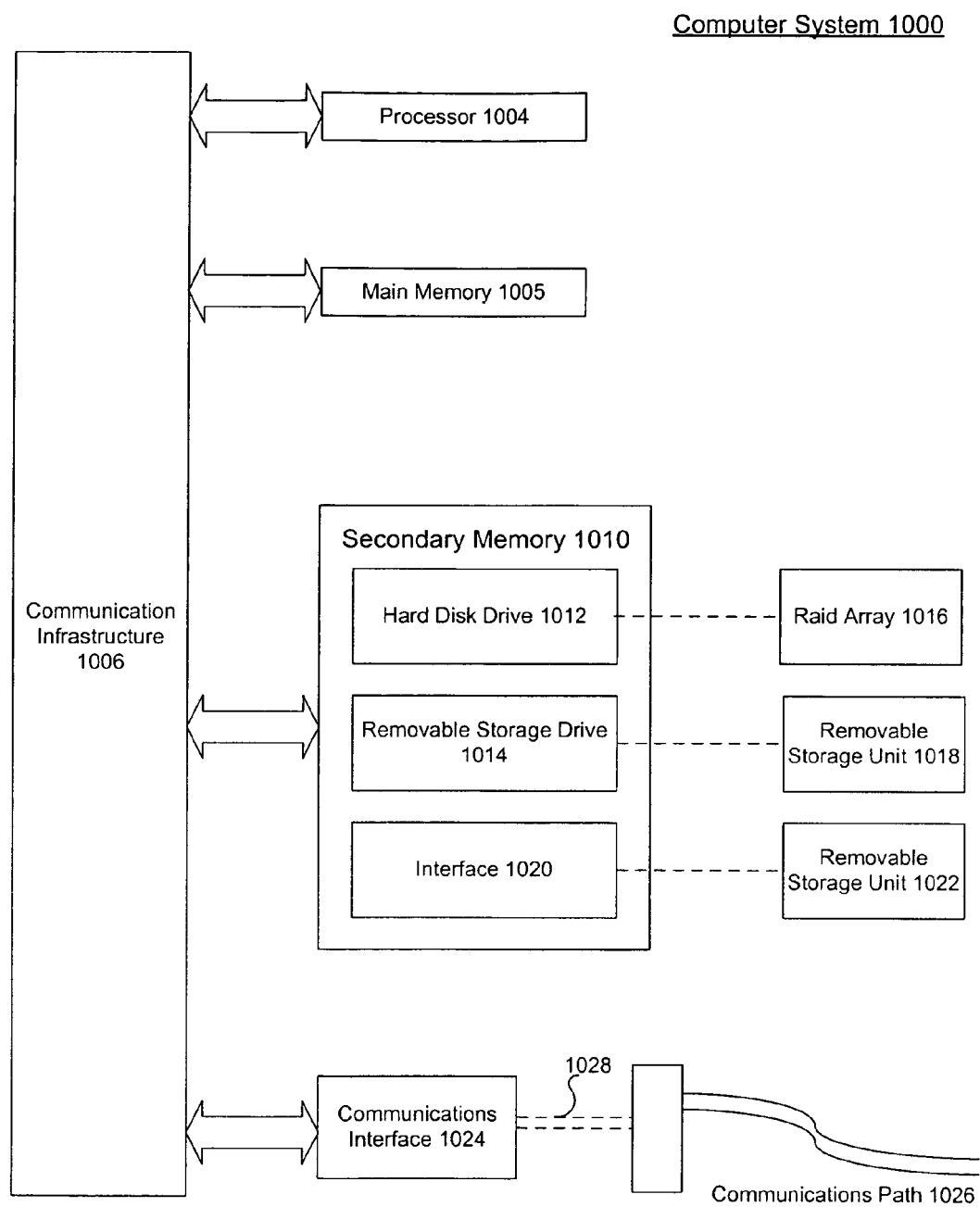
FIG. 10 illustrates a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 1000 is shown in FIG. 10. The computer system 1000 includes one or more processors, such as processor 1004. Processor 1004 can be a special purpose or a general purpose digital signal processor. The processor 1004 is connected to a communication infrastructure 1006 (for example, a bus or network). Various software implementations are described in terms of this exemplary computer system. After reading this description, it will become apparent to a person skilled in the relevant art how to implement the invention using other computer systems and/or computer architectures.

Computer system 1000 also includes a main memory 1005, preferably random access memory (RAM), and may also include a secondary memory 1010. The secondary memory 1010 may include, for example, a hard disk drive 1012, and/or a RAID array 1016, and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. As will be appreciated, the removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path 1026. Communications path 1026 carries signals 1028 and may be implemented using wire or cable, fiber optics, a phone line, a cellular phone link, an RF link and other communications channels.

The terms "computer program medium" and "computer usable medium" are used herein to generally refer to media such as removable storage drive 1014, a hard disk installed in hard disk drive 1012, and signals 1028. These computer program products are means for providing software to computer system 1000.

Computer programs (also called computer control logic) are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1004 to implement the processes of the present invention. Where the invention is implemented using software, the software may be stored in a computer program product and loaded into computer system 1000 using raid array 1016, removable storage drive 1014, hard drive 1012 or communications interface 1024.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Conclusion

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. While various embodiments of the present invention have been described above, it should be understood that they have been presented by way of example, and not limitation. It will be apparent to persons skilled in the relevant art that various changes in form and detail can be made therein without departing from the spirit and scope of the invention.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A memory system comprising:

a level 1 (L1) cache including L1 tag memory and L1 data memory;

a level 2 (L2) cache coupled to the L1 cache, the L2 cache including L2 tag memory having X L2 tag entries and a L2 data memory having Y L2 data entries; and a memory controller coupled to the L1 and L2 caches and configured to (a) determine, in response to receiving a tag and associated data, if L2 tag entries associated with L2 data entries are unavailable, (b) determine if a first tag in a first L2 tag entry, associated with a first data in a first L2 data entry, has a corresponding more recent data or a duplicate value of the first data in the L1 data memory, and (c) move the first tag to a second L2 tag entry that is not associated with a L2 data entry, vacate the first L2 tag entry and the first L2 data entry and store the received tag in the first L2 tag entry and the received data in the first L2 data entry;

wherein X is greater than Y.

2. The memory system of claim 1, wherein the L2 tag memory and L2 data memory comprise Random Access Memory (RAM).

3. The memory system of claim 1, wherein the L1 cache and the L2 cache are part of an inclusive memory hierarchy.

4. The memory system of claim 1, wherein a presence bit associated with the first tag in the second L2 tag entry indicates whether data corresponding to the first tag is present in the L1 data memory.

5. The memory system of claim 1, wherein a dirty bit associated with the first tag in the second L2 tag entry indicates whether data corresponding to the first tag in the second L2 tag entry and stored in the L1 data memory is a more recent data or a duplicate value of the first data.

6. The memory system of claim 1, wherein the memory controller is configured to determine if a L2 tag entry with a corresponding L2 data entry is available.

7. The memory system of claim 1, wherein upon receiving a new tag and corresponding new data, if all L2 tag entries and all L2 data entries are unavailable and if it is determined that a more recent or duplicate of any of the data stored in L2 data entries is unavailable in the L1 data memory, the memory controller is configured to write back data of a L2 data entry to a lower level of memory hierarchy, vacate the L2 data entry and the corresponding L2 tag entry and write the received new tag to the vacated L2 tag entry and the received new data to the vacated L2 data entry.

8. A method for storing data in a memory system, the memory system including a memory controller, a level 1 (L1) cache having a L1 tag memory and a L1 data memory, and a level 2 (L2) cache having a L2 tag memory including a first set of tag entries and a L2 data memory including a second set of data entries, comprising:

(1) receiving a tag and corresponding data;

(2) determining if all L2 tag entries having corresponding L2 data entries are unavailable;

(3) determining if a first tag in a first L2 tag entry associated with a first data in a first L2 data entry has a corresponding more recent data or a duplicate value of the first data in the L1 data memory;

(4) moving the first tag to a second L2 tag entry that does not have a corresponding L2 data entry;

(5) vacating the first L2 tag entry and the first L2 data entry; and (6) storing the received tag in the first L2 tag entry and the received data in the first L2 data entry;

wherein the number of entries in the first set is greater than the number of entries in the second set.

9. The method of claim 8, wherein step (4) further comprises determining if a L2 tag entry that does not have a corresponding L2 data entry is available if it is determined in step (2) that all L2 tag entries with corresponding L2 data entries are unavailable.

10. The method of claim 8, wherein step (4) further comprises storing a presence bit associated with the first tag in the second L2 tag entry to indicate whether data corresponding to the first tag is present in the L1 data memory.

11. The method of claim 10, wherein step (4) further comprises storing a dirty bit associated with the first tag in the second L2 tag entry to indicate whether data corresponding to the first tag in the second L2 tag entry and stored in the L1 data memory is a more recent or duplicate data.

12. The method of claim 8, wherein the L2 tag memory and L2 data memory comprise Random Access Memory (RAM).

13. The method of claim 8, wherein the L1 cache and the L2 cache are part of an inclusive memory hierarchy.

* * * * *